2 Sheets—Sheet 1.
J. W. EPLEY.
Quicksilver-Furnace.
No. 217,518.   Patented July 15, 1879.
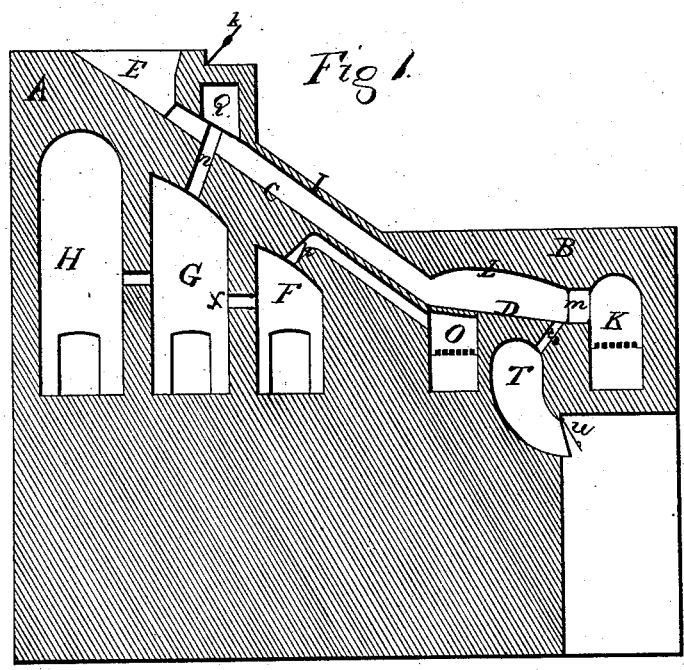
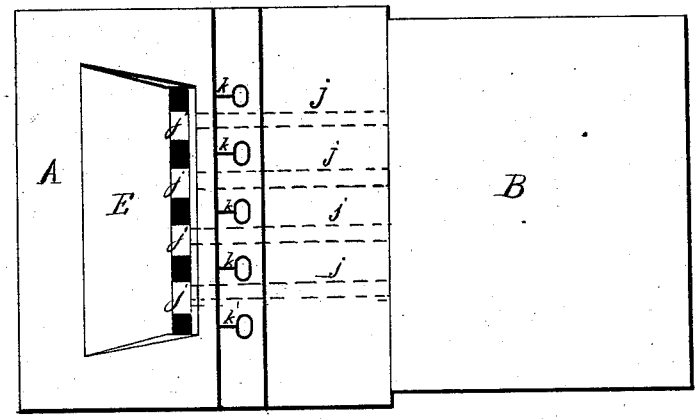
Witnesses
Dan Patten
R. F. L. Hallock
Inventor
John W. Epley
per John L. Boone
Attorney 2 Sheets—Sheet 2.
J. W. EPLEY.
Quicksilver-Furnace.
No. 217,518. Patented July 15, 1879.
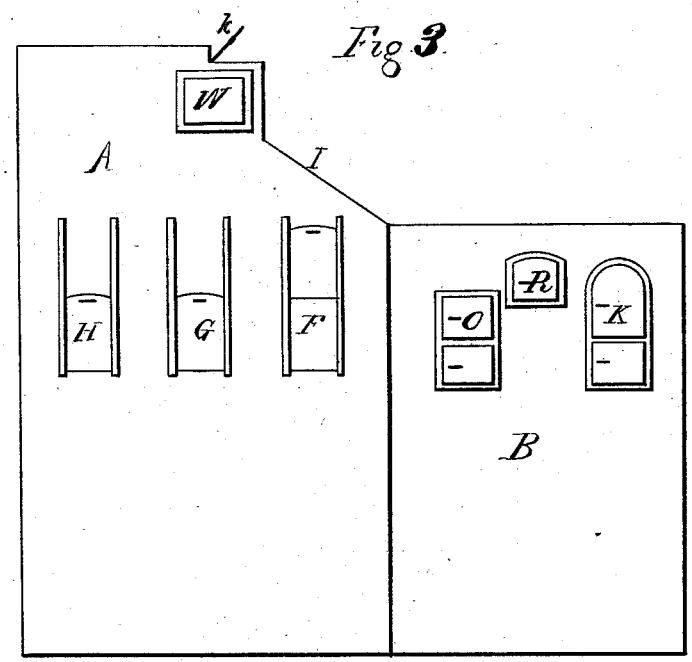
Witnesses
D. B. Lawler
W. F. Clark
Inventor
John W. Epley
per Jno. L. Boone
Attorney

UNITED STATES PATENT OFFICE.

JOHN W. EPLEY, OF POPE VALLEY, CALIFORNIA.

IMPROVEMENT IN QUICKSILVER-FURNACES.

Specification forming part of Letters Patent No. 217,518, dated July 15, 1879; application filed July 24, 1878.

*To all whom it may concern:*

Be it known that I, JOHN W. EPLEY, of Pope Valley, Napa county, California, have invented an Improved Quicksilver-Furnace; and I do hereby declare that the following is a full, clear, and exact description thereof, reference being had to the accompanying drawings.

My invention has reference to certain improvements in furnaces for reducing quicksilver and other ores that contain a volatile metal or mineral; and it consists, first, in combining, with a furnace having an inclined floor, two main and an auxiliary fire-place and a reverberatory furnace; and, further, in combining, with the furnace constructed as described, a fume-chamber, passages leading therefrom into a condensing-chamber, and an auxiliary fire-place, all as fully hereinafter explained.

Referring to the accompanying drawings, Figure 1 is a side sectional elevation. Fig. 2 is a plan view. Fig. 3 is a side view.

The furnace structure has one portion (marked A) constructed higher than the other portion, (marked B.) The inclined floor C extends from the top of the highest part A downward at the desired angle, and connects at its bottom with a horizontal floor, D, in the lower part of the structure. E is the hopper, above the inclined floor in which the ore is placed in order to feed it to the furnace. G H are two condensing-chambers. F is a separating-chamber, which is arranged under the inclined floor. The inclined floor C and the hopper E extend from one wall of the furnace to the other. The floor has a roof, I, above it, leaving only a narrow space between the floor and roof, so as to form an inclined passage, down which the ore will descend by its own gravity. The space between the floor and roof is divided at intervals by parallel partitions *j j*, which divide it into a number of parallel passages, each passage having a separate feed-opening connecting it with the hopper E, and each opening leading from the hopper having a separate slide or door for closing it.

The inclined floor C is made of tiles properly supported, so as to leave a narrow space underneath them, which extends from the lower part of the floor to near its top. K is the main fire-place, which is constructed entirely across the furnace in front of the horizontal floor or hearth D, so as to be fired at both ends. Above the floor D is an arched roof, L, which converts the lower part of the furnace into a reverberatory furnace. The fire from the fire-place K passes through pigeon-holes *m m* in the wall in front of this furnace, and, striking the roof L, is thrown down upon the material on the hearth D, and thence it passes up the inclined passages over the ore, and then, with the fumes evolved from the ore, passes into the chambers Q, and from there through passages *n n* into the second condenser, G. These passages *n n* go through the partitions *j j* in the direction of their height, as hereinafter more fully described.

O is another fire-place, which is constructed across the furnace at the foot of the inclined floor, so as to communicate with the space underneath the floor C. The heat from this fire-place passes up underneath the floor C, and is conducted by passages or flues *p* into the separating-chamber F.

The ore, either fine or coarse, is filled into the hopper E, and the slides *k* are opened, which allows it to run down the inclined passages and distribute itself over the inclined floor, and also upon the horizontal hearth D. The heat from the fire-place K will then enter through the pigeon-holes *m m* and be reverberated by the roof L upon the ore on the hearth D; thence it passes up over the ore as it lies distributed on the inclined floor C and enters a chamber, Q, which is constructed across the furnace in front of the hopper E, from whence the downward-leading flues *n n* conduct it into the second condenser, G. Part of the fumes enter the separating-chamber F through the passage X, and are there separated from the soot, and then again pass into the condensing-chambers G and H. The heat from the fire-place O at the same time passes up under the floor C, and heats the floor to a high degree, so that the ore is heated both above and below.

A door, R, is made in each side of the furnace, which opens into the reverberatory furnace above the horizontal hearth, so that when the ore on the hearth is sufficiently roasted it can, by introducing a rake through the door R, be raked into the openings S S S, which are ranged along the front of the hearth. Falling through these openings, the heated ore is caught in a chute, T, where it is allowed to remain until all the fumes have escaped and ascended through the same passages S S, after which it is withdrawn through the inclined chute T into cars and removed. The end of the chute T is closed by a hinged door or valve, U, which prevents the descent of the spent ore until it is opened.

As fast as the ore is raked from the hearth D fresh ore is admitted from the hopper by opening the slides K, so that the ore will settle downward by its gravity and keep the hearth D supplied, thus rendering the operation continuous and the furnace also self-feeding and self-stirring.

By the ordinary method heretofore used, quicksilver condensed directly from fumes which have been separated from the ore by the direct action of heat mingled with the products of combustion from the fire-place were intermingled to a large extent with soot, so that a further treatment was required in order to separate the mercury from the soot.

I have discovered, however, that by subjecting the fumes to a supplemental heating process after they leave the ore-chamber, and before they enter the condensers, I avoid this difficulty, and the mercury will condense in a clean condition, free from soot. To adapt this improvement or discovery to my improved furnace, I construct a fire-place, W, in the fume-chamber Q, (one at each end of the chamber,) in which I maintain a hot fire, the smoke of which may be led to a smoke-stack, blower, or suction-fan. The fumes are, therefore, subjected to a supplemental volatilization in this chamber, which frees them from the soot, so that they enter the condenser in a condition to condense separately.

It will be remembered that I conducted the heat from the fire-place O into the separating-chamber F, instead of permitting it to escape. My object in doing this is to heat the first condenser into which the fumes enter, and thus avoid any liability of the soot and mercurial fumes becoming again entangled.

As a matter of course a large number of condensers will be used, as heretofore; but I have only shown three, because the others will be made and used in the ordinary manner. From the arrangement of the two condensers G H, and their connection with the fire-places O W, the fumes will be kept heated and separated until the soot settles, while the fumes will move on and condense separately.

This furnace can be used for treating either fine or coarse ore without any alteration whatever; or fine and coarse ore may be mixed and fed into it at the same time. The ore is stirred by the repeated short descents as it moves down the incline, so that every portion is exposed, and when it lands on the hearth it is subjected to such high degrees of heat that all the volatile portions are driven off.

I am aware that it is not new to provide an ore-roasting furnace with an inclined shelf divided by vertical partitions into channels down which the ore moves by gravity, and that it is old to provide means for heating such shelf upon its upper and lower sides; also, that it is old to condense the vapors by passing them into a chamber communicating with a condenser, and I do not desire to claim these devices, broadly; but,

Having thus described my invention, what I claim, and desire to secure by Letters Patent, is—

1. The combination, with a furnace provided with an inclined floor, C, of the fire-places K, O, and W, and reverberatory furnace L D, substantially as and for the purpose set forth.

2. The combination, with a furnace provided with an inclined floor, C, and one or more condensers, G H, of the passages $n$ and fume-chamber Q, having an auxiliary or supplemental fire-place, W, substantially as and for the purpose specified.

In witness whereof I have hereunto set my hand and seal.

J. W. EPLEY. [L. S.]

Witnesses:
   DAN. PATTEN,
   JNO. L. BOONE.